Patented Oct. 15, 1940

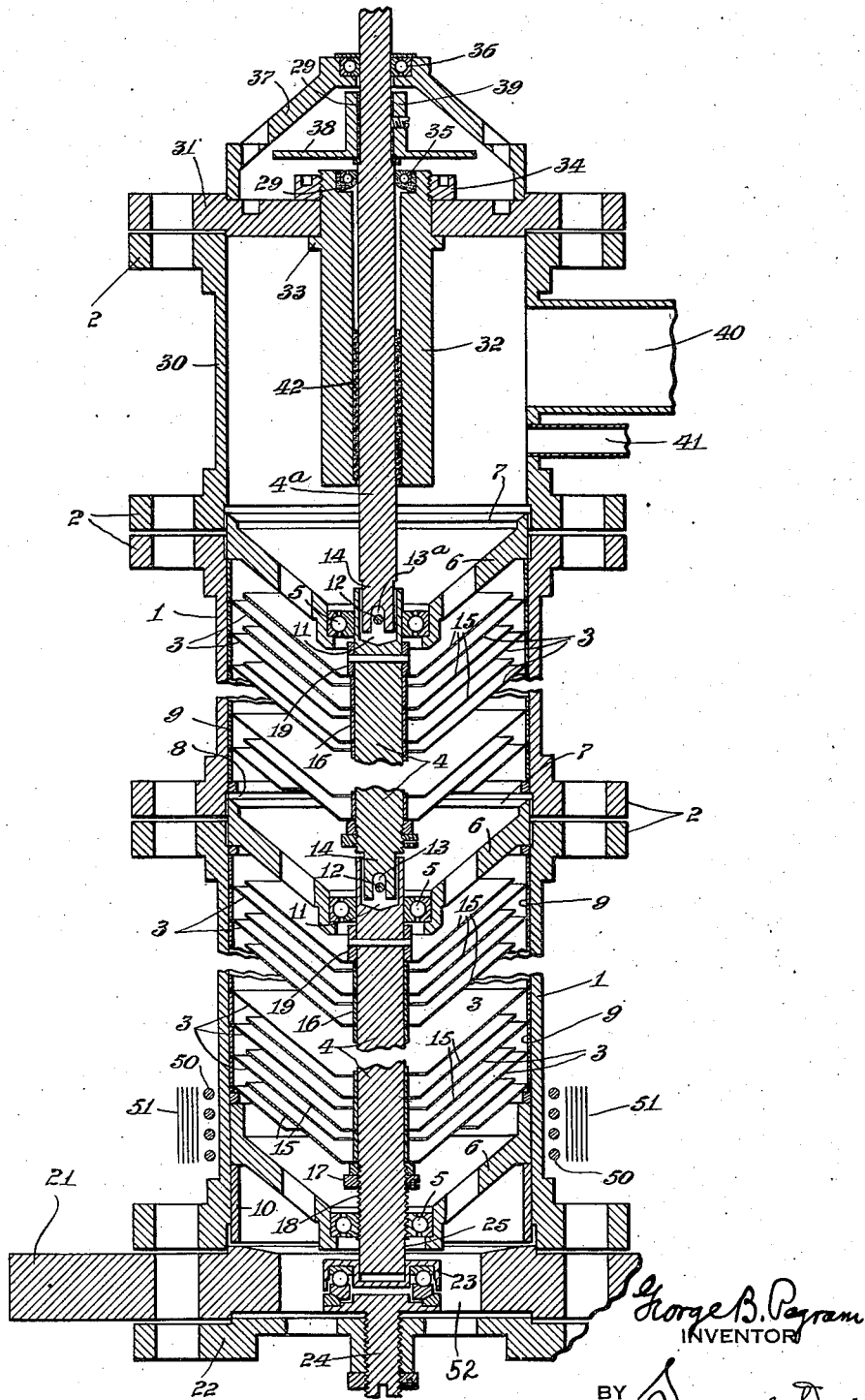

2,218,342

UNITED STATES PATENT OFFICE 2,218,342

DISTILLATION COLUMN

George B. Pegram, New York, N. Y., assignor to The Chemical Foundation, Incorporated, a corporation of Delaware Application April 6, 1938, Serial No. 200,551

2 Claims. (Cl. 261—89)

This invention relates to new and useful improvements in distillation columns.

It is the object of the present invention to provide a compact and efficient distillation column for separating the constituents of a fluid, which constituents have boiling points within a few degrees or a fraction of a degree from one another. For instance, the distillation method and column are adapted for separating the light and heavy constituents of water and thus producing "heavy" water, i. e., one in which the concentration of hydrogen or oxygen isotopes is increased as compared to ordinary "light" water ($H_2O$), or for separating petroleum materials of boiling points close together.

In accordance with the present invention, in order to attain in a given volume of distilling column a long counterflow path with large area for liquid surface, the liquid is spread out in a thin layer or film, arranged in a succession of chambers within each of which there is rapid motion of the vapor with respect to the liquid surface, with avoidance of back diffusion.

In my new improved column there is the usual flow of vapor from a boiler toward a condenser. The counterflow of the liquid from the condenser toward the boiler is attained by providing a set of successive stationary diaphragms in the cylindrical column, each diaphragm being of a conical, bowl, or funnel shape with a central hole and with the periphery of the diaphragm closely attached to or fitting the wall, so that any liquid falling into one of these diaphragms will tend to flow downward by gravity to and then through the central hole. Intermediate in position between the stationary diaphragms and alternating with them I provide somewhat similar diaphragms, cones, cups, or bowls. These are smaller in diameter than the stationary diaphragms and do not reach to the wall of the column. The last mentioned diaphragms have no central openings and are axially attached to a rotating vertical shaft. Liquid falling from one of the stationary diaphragms into one of the rotating cones will tend to be thrown off by centrifugal force and flow outward from the axis of rotation and therefore upward to the periphery of the rotating cone. The rotating cone will spray the liquid out toward the wall of the column from whence the liquid will fall into the stationary diaphragm next below.

The speed of rotation of the rotating set of cones must not be less than that required to cause any liquid in the cone to flow outward and upward to the periphery and thence off. Vapor from the boiler passes upward through the central hole in a fixed diaphragm into the space between the fixed diaphragm below and the rotating cone above, thence upward and outward, through the annular space between the periphery of the rotating cone and the outer wall, thence inward and downward in the space between the rotating cone below and the stationary diaphragm above, thence through the central opening into the space above, and so on through the column. The counterflow liquid moves along the same course in the opposite direction, flowing down a fixed diaphragm to the central aperture, thence dropping into the rotating cone immediately below, and being carried by centrifugal force outward and upward to the periphery of the rotating cone, there to be thrown off and to run down into the stationary diaphragm next below, and so on down through the column.

The effectiveness and efficiency of operation of a counterflow distilling or separatory column requires: (1) that the flow of both vapor and liquid in their respective directions through the column shall not be subject to back diffusion or to more or less local back flow currents; (2) that the rapid attainment of equilibrium as to evaporation and condensation between the liquid and the vapor in any region of the column be assisted by having the ratio of the surface of contact between the liquid and the vapor as large as is compatible with the required flow through the column, and that the vapor and the liquid surface be kept in relative motion so that evaporation and condensation be assisted in the same way as evaporation is assisted when air is blown over water as compared with stationary air over water.

In the distillation column arranged in accordance with the present invention the requirements as specified above are well met, since the design and operation affords little opportunity for disturbance of the regular counterflow by any back diffusion or local counter currents from one of the succession of conical chambers to the next. To introduce any holes or apertures in the stationary or rotating diaphragms, other than the central hole in each stationary diaphragm, would militate against the use of this invention to the best advantage because such holes would produce local interference with the steady flow and counterflow of vapor and liquid, and would tend to mix both vapor and liquid in two successive chambers of the column.

The requirement (2) above is accomplished in accordance with this invention by having the liquid flow in a thin film by the action of gravity while flowing down the stationary diaphragms, and by centrifugal force when flowing up the rotating cones, an important feature of this invention being the avoidance of a large holdup of the liquid in the column as compared with columns in which the liquid flows by gravity only. At the same time, the motion of the rotating parts provides in each chamber of the column the desirable relative motion of the vapor and the liquid to accelerate the approach to equilibrium between the vapor and the liquid phase. The provision of any roughnesses, or corrugations, or projections, or radial arms on the rotating or stationary cones would be disadvantageous in the operation of such a column because the presence of any such impediments to smooth flow in a thin film would tend to cause a greater holdup of liquid relatively inactive in bringing about the local equilibrium between the vapor and the liquid phase.

In order to obtain all the benefits of the present invention, the following factors should be considered in the construction and operation of the distillation column:

In the counterflow of vapor from the boiler toward condenser and of the liquid from the condenser toward boiler, diffusion against proper direction of flow in either liquid or vapor must be avoided.

There should be a rapid approach to equilibrium in the composition of liquid and vapor.

Large surfaces are required in each region of the path of the counterflow liquid in contact with vapor.

The liquid must be in a thin layer and the vapor not of excessive volume.

Rapid circulation of vapor with respect to the liquid film in each chamber should be attained without backward diffusion.

The backward diffusion should be prevented by division into a succession of chambers with relatively narrow opening between them.

High fractionating factor, i. e., the rate of flow through the column, should be as large as possible, compatible with the preceding requirements. Other things being equal, the fractionating effect will be greater the greater the length of the counterflow path, i. e., the number of chambers.

The drawing represents a vertical cross-section of the principal elements of the distillation column, the parts being shown not in the finally assembled condition, but slightly spaced from one another, more clearly to show certain details of the construction.

The distillation column is built up of a plurality of cylindrical shell sections 1, having flanges 2 by means of which adjacent sections may be held together. Each shell section 1 has fractionally mounted on its inside wall a plurality of parallel diaphragms or discs 3 held apart by split ring spacers 9 snugly fitting the shell 1. The discs are centrally perforated and are inclined at an angle of about 40° with respect to 1. The apertures in discs 3 are indicated by reference numeral 3a and are large enough for central shaft sections 4 to pass through them.

The shafts 4 are journaled in ball bearings 5 held in perforated rings 6. The rings 6 are parallel with the cone-shaped discs 3 and their flanged outer rims are clamped between recesses in adjacent shell sections 1. The flange on the rings 6 is indicated at 7 and the recess in the column section at 8. The lowermost ring 6 has its peripheral flange seated in a recess in a relatively thick lining 10 in the base of the bottom column section of the shell 1.

The upper ends of the shaft sections 4 are hollowed out as indicated at 11 and are traversed by a pin 12. The lower ends of the shaft sections are forked as indicated at 13, 13a and are of reduced diameter as indicated at 14 to fit within the hollow 11 of the adjacent shaft where the fork of one shaft engages the pin 12 of the other shaft.

Parallel discs 15 project from shaft 4 spaced apart by washers 16. The discs 15 have central horizontal portions 15a but most of their surface is inclined toward shaft 4 at the same angle as discs 3 are inclined towards the axis of the column. The spacing between the two sets of discs is the same so that when they are interleaved as shown, they will form a chamber of zigzag cross-section and of the same width throughout. The stationary and rotating cones have smooth surfaces which will be "wet" by the liquid but will not impede free flow through the column.

In assembling the column, first in each section a ring 6 with its bearing 5 and shaft 4 is put in place. Next a cone 15 is pushed on shaft 4 and held in place by spacer ring 16. A ring 9 is then pushed in the shell against 16. A stationary cone 3 is then inserted and held in place by the next ring 9, whereupon the next rotary cone is inserted and the assembling continued as above described.

The disc assembly 15 is held in place by a collar 17 on the screw-threaded lower end 18 of the shaft and a collar 19 pinned to the shaft near its upper end.

The assembled bottom section of 1 is then seated on ring 21 which in turn is seated on a perforated ring 22. A thrust bearing 23 is centrally mounted by means of an adjustable screw-threaded plug 24 in the ring 22 and the recessed lower end 25 of shaft 4 is seated in said bearing 23. The whole load of the shaft is taken by the thrust bearing 23.

The next column section is assembled in a like manner and placed on top of the bottom section with the forked end 13 of the shaft section engaging pin 12, and similarly with the successive sections, as 13a and others.

When the top column section 1 is in place, a cylindrical header 30 is placed on it, clamping the top ring 6 in place. 40 is an outlet for vapor and 41 an inlet for condensed liquid in the header 30. The top of header 30 is closed by a plate 31. The top plate 31 carries a sleeve 32 extending almost to the bottom of cylinder 30, the top plate 31 being clamped between a shoulder 33 of sleeve 32 and a nut 34 screwed on the projecting end of the sleeve. The sleeve 32 is traversed by a shaft section 4a having a forked lower end 13a which engages the pin 12 in the topmost shaft section 4.

The shaft 4a is journaled in ball bearings 35 and 36, the former seated in a recess of the screw-threaded end of sleeve 32 and the latter in a recess of a dome 37 on the upper end of shaft 4a and seated in a groove in top plate 31. 42 is a carbonized bronze bearing for shaft 4a in sleeve 32. Within dome 37 the shaft 4a carries a disc 38 mounted thereon by means of a hub 39. 29 is a fluid seal. 50 indicates a heating wire and 51 insulation that may be wrapped around the column.

When power is applied from a suitable source (not shown) to rotate the shaft 4a, it will rotate all the shafts 4 coupled together and with these shaft sections will rotate the sets of cones 15 mounted thereon. The vapor introduced at the bottom of the column at openings 52 will rise and traverse the spaces between the successive stationary and rotating cones, 3 and 15, which act as baffles, to the header 30. The reflux liquid condensate will flow down through the first ring 6 onto the first rotating cone 15. From this rotating cone the fluid runs up by centrifugal action and then flows down to the next fixed cone, and thus the condensate flows alternately over the smooth upper faces of the interleaved fixed and rotating cones and forms films on the moving cones under the effect of centrifugal force acting thereon and establishes films successively on the fixed cones under the force of gravity, the condensate thus returning by gradations through the spaces between the successive pairs of cones countercurrent to the rising vapor.

The lighter constituents will leave the header through 40 and the heavier constituents will condense and flow down through the lowest ring 6 and openings 52 to be collected there.

Since the surfaces with which the vapor and liquid contact are the smooth, uninterrupted, continuous surfaces of rotation of frustums of cones and the rings 6 as well as the cones are inclined, neither liquid nor vapor can collect anywhere in pockets nor can the film formation on the upper faces of the rotating cones be obstructed or interrupted. The rotating cones stir up the vapor in a direction perpendicular to the flow, and by centrifugal force successively reform the liquid film surfaces thereon, and thus contribute to the speeding up of the evaporation and condensation processes and, therefore, to the establishment of equilibrium.

My process of separating closely boiling constituents of a mixed liquid essentially consists in vaporizing the liquid; leading the vapor into a distilling column through which some liquid condensate is flowing countercurrent to the vapor flow; maintaining the liquid phase over an extended surface by establishing the liquid phase as a series of thin liquid films formed alternately by gravity and centrifugal force; whereby the liquid in each separate liquid film constantly varies in composition as it becomes concentrated with respect to the high-boiling constituent, while the vapor in contact with it varies in composition in an inverse manner, becoming concentrated with respect to the low-boiling constituent; and whereby equilibrium between the two phases is rapidly attained due to the fact that the liquid is established and maintained substantially in the form of a thin liquid film and continuously contacted with the vapor phase throughout the process.

The column has been used to separate oxygen isotopes, and good results were obtained with a column 35 feet high made in seven interlocking sections 1. Each shell section 1 was wrapped with heating wire as indicated at 50, and seven layers of aluminum foil insulation 51. The column contained 621 pairs of cones, 3 and 15, giving, on the basis of 85% efficiency, the equivalent of more than five hundred "plates." The diameter of the sections 1 was six inches. The diameter of the shaft 4 was one inch, and the overall diameter of the rotating cones 5⅝". The stationary and rotating cones were made of 22-gauge drawn sheet steel and were spaced ⅝" apart. The diameter of aperture 3a was 1¾" and the horizontal center portion 15a of cones 15 had a diameter of 1⅞". The header 30 was six inches high. The shaft and associated cone assembly were operated at a speed of 240 R. P. M.

With the above described column constructed in accordance with the principles of my invention, equilibrium was established after some 70 hours of running on "light" water. Where, as in the present case, the fractionation factor is close to unity, with columns of the usual construction it would take about one hundred days to establish equilibrium. By running the column for about twenty days, nearly a fivefold increase in the concentration of the oxygen isotope of atomic weight 18 has been effected. According to calculations, after 50 days running, 20 cc. of water having a concentration of 2.5% $H_2O^{18}$ can be obtained with the column constructed as above described.

Obviously, the dimensions, spacing, disc construction, speed of rotation and other factors must be proportioned to suit specific operating requirements and the nature of the liquid to be distilled.

What is claimed is:

1. In a distillation column, a shell divided into a plurality of sections, each section having a shaft axially traversing it, means for linking one shaft section with the adjacent shaft sections, a plurality of diaphragms mounted on said shaft section, spacer rings on said shaft section separating said diaphragms, said diaphragms being cone-shaped in cross-section, a plurality of diaphragms cone-shaped in cross-section interleaved with the first mentioned diaphragms and perforated at their centers to allow the shaft to pass therethrough, frictional mounting for the last-mentioned diaphragms on the inside wall of the shell section including spacer rings between adjacent diaphragms, and means for rotating said shaft sections with the diaphragms mounted thereon.

2. In a distilling column, a shell divided into a plurality of sections, each section having a perforated ring near the top and the bottom of the section and having a cone-shaped cross-section inclined at an angle of 40° with respect to the axis of the column, bearings in said rings, a shaft section journaled in said bearings and axially traversing the shell section, means for linking one shaft section with the adjacent shaft section, a plurality of diaphragms mounted on said shaft section, spacer rings on said shaft section separating said diaphragms, said diaphragms being cone-shaped in cross-section and inclined at an angle of 40° to the axis of the column, a plurality of diaphragms cone-shaped in cross-section and inclined at an angle of 40° with respect to the axis of the column, said last-mentioned diaphragms being interleaved with the first-mentioned diaphragms and perforated at their centers to allow the shaft to pass therethrough, frictional mounting for the last-mentioned diaphragms on the inside wall of the shell section including spacer rings between adjacent diaphragms, the spacing of all the diaphragms being the same, and means for rotating said shaft sections with the diaphragms mounted thereon at a speed to force liquid up the slope of a diaphragm and over the periphery of the same onto the next stationary diaphragm.

GEORGE B. PEGRAM.